March 2, 1965  C. E. WOLCOTT  3,172,103
MOVING TARGET INDICATION
Filed May 20, 1963  2 Sheets-Sheet 2

INVENTOR.
CHARLES E. WOLCOTT
BY
ATTORNEYS 3,172,103
MOVING TARGET INDICATION
Charles E. Wolcott, El Cajon, Calif., assignor to Whittaker
Corporation, a corporation of California
Filed May 20, 1963, Ser. No. 281,567
13 Claims. (Cl. 343—7.7)

The present invention relates to radar systems in which the radar station position may remain fixed or placed in motion relative to a target and discriminate between fixed and moving targets.

The system described herein involves new means and techniques for detection of moving targets and serves to determine the radial component of velocity contained in a pulse echo return. The detection circuity analyzes the echo radial component in a value which is twice the Doppler phenomenon frequency. Target echo reception and detection is accomplished by a heterodyne sum and difference frequency character of the receiving system used.

It is well known that radar detection of moving air objects over fixed objects or land masses is extremely difficult, a fact which prevails in conventional radar systems. Heretofore, systems that select only objects in motion relative to the detecting system have been proposed which are either based on a change in phase of received continuous wave echoes compared to a suitable reference frequency, or the comparison of the echo pattern for a given area on successive transmitted frequency pulses.

One of such prior art systems is based on the fact that the apparent frequency of radiated energy at a fixed observation station is changed when the reflecting object has motion relative to the observing station. Upon the transmission of continuous or unmodulated radio frequency waves toward an object to be located, the reflecting object then becomes, in effect, a secondary source of waves. The frequency of these secondary waves will be increased or decreased if the reflecting object possesses a radial velocity relative to the receiving station. The magnitude of frequency shift is proportional to the radial velocity. Such systems, however, require radiation of continuous wave frequencies and require a fixed observation station, therefore limiting operational performance.

Another of such prior art systems involves the reception and storage by a delay storage means, the echo pattern of signal frequencies and the comparison of these frequencies to a further and following echo pattern at the time duration of the storage delay period. The echo pattern comparative process is accomplished by a so-called coherent detector (coho) circuit which performs fixed signal cancellation by subtraction circuity, and has an output corresponding to the comparative difference. Such systems require a fixed station location and therefore are limited in operational application. The above system can be modified to compensate for velocity should the system be located on a moving platform such as a ship or aircraft. This modification would require that an oscillator supply a signal at the doppler frequency to be mixed with the system reference frequency, thus changing the phase of the reference signal at the same rate as that at which the phase of fixed echo signals are being changed by the motion of the station. The effect is to give the station a virtual velocity which cancels the actual velocity. Since the doppler frequency depends upon the radial component of velocity, and is therefore proportional to azimuth or scan angle, it is necessary to vary the frequency of the doppler oscillator automatically as the antenna scans. Conversely, in an airborne system, there exists a further complication due to the fact that the radial velocity depends on the scan depression angle, which means, the doppler frequency of the ground clutter varies with range. In consequence, the phase shift unit cannot be used for clutter at large depression angles.

The alternative modification of the above described system is referred to as a noncoherent method. However, with the noncoherent method a moving object can be detected only when there is ground clutter at the same range and relative azimuth direction as the object. Beyond this range objects become lost in clear places.

The present invention involves a relatively simple method of data procurement from radial targets. A primary difference between the present MTI (Moving Target Indicating) system and a conventional Air Search Radar System involves the use of a dual channel receiving and detector system. The present radar system provides the standard "all target" display (fixed land masses, targets in motion, etc.) on a radar repeater monitor and simultaneously provides a MTI (moving target only) display on another radar repeater or on the same repeater by suitable switching. Of great importance, the present radar system can be installed on a naval ship and operated while the ship is in motion to display all targets in motion at a radial rate in excess of the ships radial rate. Additional features include a moving target warning alarm, a display of the section in which the target is moving, and a numerical display of the target approximate radial rate.

Existing naval shipboard air search radar systems can be modified to incorporate the features of this invention. Further, this system may find uses in Army land tank warfare.

It is a primary object of the present invention to provide improved means and techniques useful in the detection of fixed objects and moving objects from a moving or fixed observation station with the capability of selecting and displaying either or both moving objects or moving and fixed objects by means of radio detection and ranging equipment (radar).

It is a further object of the invention to provide a method and means of compensation for variable radial velocity of the observation station as, for example, when the system is located on a carrier vehicle in motion.

It is a further object of the invention to provide an improved automatic method and system of reception of radar echo signal frequencies from an object or objects possessing a radial component of velocity in which these echoes automatically actuate an early warning alarm.

It is a further object of the invention to provide improved means and techniques for transmission and reception of radar signal and echo frequencies involving a dual channeled superheterodyne receiver, one of such channels including a superheterodyne converter with locally produced oscillations higher in frequency than the transmitted frequency to produce a predetermined intermedate frequency, and a second of such channels including a superheterodyne converter with locally produced oscillations lower in frequency than the transmitted frequency by the frequency dfference of the selected intermediate frequency. The two channel intermediate signal frequencies are compared by a heterodyne method of detection to interpret received echo signal frequency difference from the transmitted signal frequency.

It is a further object of the invention to provide improved means and techniques for producing two frequencies of stable local oscillations, one such frequency being higher in frequency than the transmit frequency by a value equal to the intermediate frequency, and the other local frequency being lower in frequency than the transmit frequency by a difference equal to the selected intermediate frequency, the lower of the two frequencies being produced by heterodyne action with a higher frequency to maintain precise frequency separation and drift compensation equal to that of the higher frequency oscillation, and therefore, constitute an automatic means of frequency control.

It is a further object of the invention to provide improved means and techniques for indicating, by visual means, a sector or sectors contained through 360 degrees of a plan position display (PPI) with the indication being actuated by an object or objects containing a radial component of velocity in excess of that possessed by the observation station.

It is a further object of the invention to provide improved means and techniques for determining and displaying the approximate radial rate of a target or targets containing a radial component of velocity.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

As previously indicated the system involves a dual-channeled, superheterodyne receiver in which pulsed radar echo heterodyned sum and difference frequencies are dual-channeled in phase differential at a mutual channel intermediate frequency to a beat frequency detecting system. The echo pulse radial velocity component of one channel is detected as a down doppler frequency shift, and the same echo pulse radial velocity component of the other channel is detected as an up doppler frequency shift. The detected output signal frequency is therefore twice the frequency of doppler due to the radial component velocity. This fact makes possible a pulsed moving target radar system which, due to the doubled output signal frequency and detection method, is more versatile in deployment and data acquisition functions than present radar systems of this type.

Figure 1:
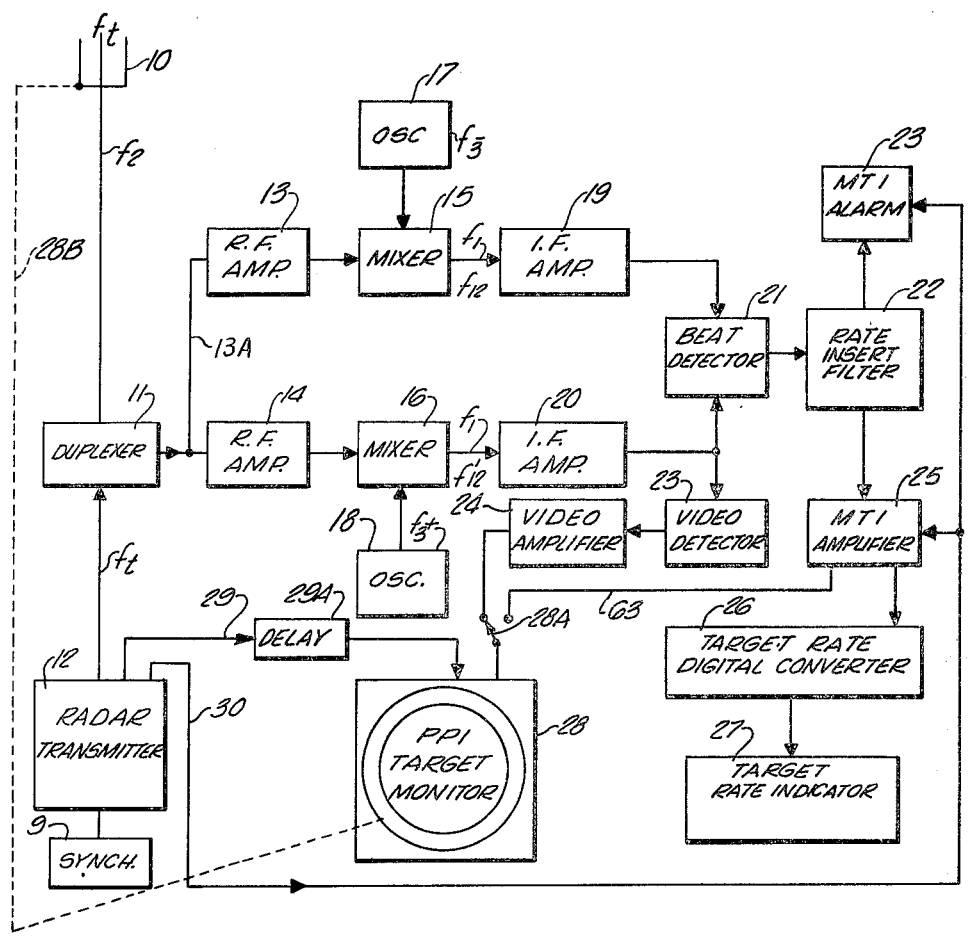
FIGURE 1 illustrates a system embodying features of the present invention.

In general, in FIGURE 1, the units 10, 11, 12, 14, 16, 18, 20, 23, 24 and 28 constitute a conventional radar system of the surface search or air search types; the addition of units 13, 15, 17, 19, 21, 22 and 25 and their functional relationship with the other units increases the performance to include the detection of moving targets and allows the station to be in radial motion during this detection. Units 23, 26 and 27 are added to enhance performance by interpreting and identifying the received signal data.

In FIGURE 1, the radar transmitter 12 produces a high level oscillation at a quasi-optical frequency which is periodically actuated by a trigger synchronizer 9 as is conventional to pulse radar systems to produce a series of pulses. The keyed signal triggers the radar transmitter 12 to generate a large power pulse referred to as $f_t$ which also designates the frequency of oscillation. This pulse $f_t$ is passed via the duplexer switch 11 to the antenna 10 and radiated through a sector in space. During the pulse generation and transmission a keying trigger signal which may be derived from transmitter 12 is supplied via circuit 30 to the MTI amplifier 25 and the MTI alarm 23 to deactivate these two units. A further trigger signal circuit 29 supplies a pulse to PPI target monitor 28 to initiate keying of the display sweep circuit therein. This latter trigger signal may be supplied to monitor 28 via a trigger delay network 29A so as to avoid display of the main transmitter pulse feed-through. When the signal switch 28A is positioned as shown to apply signals from video amplifier 24 to monitor 28 the display thereon is in accordance with the following description.

Signal echoes resulting from the transmitted pulse or pulses are received by antenna 10 and applied through suitable transmission line and duplexer 11 to the radio frequency amplifier 14 and thence to mixer 16. Local oscillator 18 generates oscillations higher in frequency than the transmitted pulse frequency $f_t$ such that the difference is equal to a predetermined intermediate frequency (F). This locally produced oscillation is coupled to mixer 16 and serves as a means to produce an intermediate frequency $f_1$ by heterodyne action. The produced intermediate frequency signals are amplified by intermediate frequency amplifier so broadly tuned to frequency $f_1$ and then applied to video detector 23 which may be referred to as the second detector of the superheterodyne receiving circuit. The intermediate frequency signals rectified by video detector 23 are applied to, and further amplified by video amplifier 24. The amplified video signals from video amplifier 24 are applied to the display input circuit of PPI (plan position indicator) target monitor 28 via switch 28A. The PPI sweep being triggered at transit time or a short delay time thereafter, received and displays the detected and amplified echo signals delayed in time an amount corresponding to the distance from the particular object from which the echo signal is derived. These delayed echo signals cause a brilliance reaction on the PPI sweep as a function of time to constitute a target display which by its presence serves as an indication of both range and azimuth, of the object or target, this being so since the PPI sweeps, which are radial sweeps of an electron beam in a cathode ray tube, are synchronized as indicated by the dotted line 28B with the movement of antenna 10 and a portion of the sweep is intensified to produce a visual indication at a time corresponding to the distance from the target or object. All echo signals are displayed by the PPI monitor 28 when ony the signals from the video amplifier 24 are monitored. These signals represent those echoes from secondary sources such as land masses, obstructions, air targets, atmospherics, etc., conventional to existing search radar systems.

The above described radar system is conventional but there are additions made thereto with important features of the present invention.

A branch circuit 13A is made to the circuit carrying received signals from duplexer 11 to RF section 14. This branch circuit 13A applies also the received signals to a like RF section 13. The received echo signals are applied from RF section 13 to superheterodyne mixer 15. Local oscillator 17 generates oscillations lower in frequency than the transmitted pulse frequency such that the difference in frequency is a frequency equal to the predetermined intermediate frequency $f_1$. This locally produced oscillation is coupled to mixer 15 to produce the intermediate frequency $f_1$ by heterodyne action. The produced intermediate frequency signals are amplified by IF section 19 broadly tuned to frequency $f_1$ and applied to beat detector 21 as signal frequencies $f_1$. In a like manner, IF section 20 which applies signals of intermediate frequency $f_1$ to video detector 23, also is connected to and couples the signal frequencies at intermediate frequency $f_1$ to beat detector 21. Echo signals received from targets which do not contain a radial component of velocity have equal frequency values in the two intermediate frequency channels, IF sections 19 and 20. These identical frequencies $f_1=f_1$ result in zero output signals from beat detector and therefore are not detected as moving targets.

However, when a target contains a radial component of velocity the character of the reception takes place as follows:

For purpose of illustration, assume a condition wherein a target containing a large radial component of velocity approaches the radar station which in itself is either stationary or moves such that such movement results in a relatively low radial component of velocity toward the target.

The rate insert filter 22 is a frequency cutoff or high pass filter which can be varied in frequency cutoff at the low end of the frequency band pass as conventional to this type of filter. The frequency cutoff adjustment is calibrated in relatively low radial velocity rates and the maximum rate may correspond to the maximum velocity rate of the vehicle upon which the radar system is installed. During radar operation rate insert filter 22 is adjusted to the prevailing vehicle rate.

The previously mentioned transmitted pulse or pulses when impinging upon a target containing a radial component of velocity are shifted in frequency by the phenomenon known as Doppler frequency shift. The value of shift in frequency shift is a function of the radial rate.

The echo signal developed by the radial target as a secondary radiation source, is reflected toward the radar antenna at a frequency changed from that transmitted which, in this example, will be higher in frequency due to the Doppler effect. The frequency shifted echo pulse is received by antenna 10 as a signal of frequency $f_2$. At the same time echo signals may be received from fixed targets or land masses, but which are not shifted in frequency and are therefore echo signals of frequency $f_t$.

As mentioned previously, local oscillator 18 produces oscillations higher in frequency than the transmitted frequency. Conversely, the locally produced oscillations of local oscillator 17 are lower in frequency than the transmitted frequency. Fixed target echo signals which are heterodyned in mixers 16 and 15 have substantially identical mixer output signals each equal in frequency to the selected intermediate frequency and are, therefore, cancelled in the circuitry of beat detector 21. However, the echo signals containing a radial component of velocity designated $f_2$, and therefore shifted in frequency from frequency $f_t$ to the higher frequency $f_2$ when applied to mixer 16 are heterodyned to produce a mixer output frequency which is lower in frequency than the fixed intermediate frequency $f_1$.

Conversely the $f_2$ echo signals are heterodyned by mixer 15 to produce a mixer output frequency higher in frequency than the intermediate frequency $f_1$. These high and low intermediate frequencies signals of frequency designated $f_{12}$, $f'_{12}$ are amplified by IF sections 19 and 20 respectively and which are tuned sufficiently broad to accept and amplify these signals are applied to beat detector 21. The beat detector 21 comprises circuitry for comparing two frequencies which have nearly the same value. It is well known that if two frequency sources are directed into a modulator so that the low-frequency second-order modulation produced goes through a resistance, the voltage produced across the resistance will vary periodically at a rate which is the difference between the two input frequencies. Thus, the beats may be counted as changes in voltage over a suitable interval. If the two frequencies are alike, there is no response and hence there is said to be zero condition. The output of beat detector 21 is substantially a sinusoidal voltage at a frequency which is equal to the difference between intermediate frequencies $f_{12}$ and $f'_{12}$. This difference frequency value will be twice the valve of the frequency shift resulting from he Doppler effect and thus the output of beat detector 21 may be expressed in terms of $2(f_t \pm f_2)$.

The detected echo radial target signal $2(f_t \pm f_2)$ is applied from beat detector 21 to rate insert filter 22. When the value of $2(f_t \pm f_2)$ is greater than the cutoff frequency value set into rate filter 22, the signal is passed, and therefore coupled to, the moving target indicating alarm 23, and the moving target indication amplifier 25. The MTI alarm 23 is a warning device of audible or other means to indicate that echo signals are being received from a target in motion at a rate in excess of the station radial rate. At the same time, an amplifier sinusoidal signal is applied from the MTI amplifier 25 to the target rate digital converter 26. The sinusoidal signal is differentiated and squared and modified by computation for target relative position, and the resultant pulse signals applied to target rate indicator 27 which is a numerical display monitor.

The MTI amplifier 25 also applies the detected target echo signals to the signal input switch 28A of PPI target monitor 28. By changing the position of the single pole double throw switch 28A to apply the signals from MTI amplifier 25 to the monitor 28, all fixed targets, land masses, etc., displayed will fade, or be removed from the display, and only the moving targets will be in display on monitor 28.

Two or more PPI target monitors may be used to simultaneously display the fixed and/or moving targets.

Figure 2:
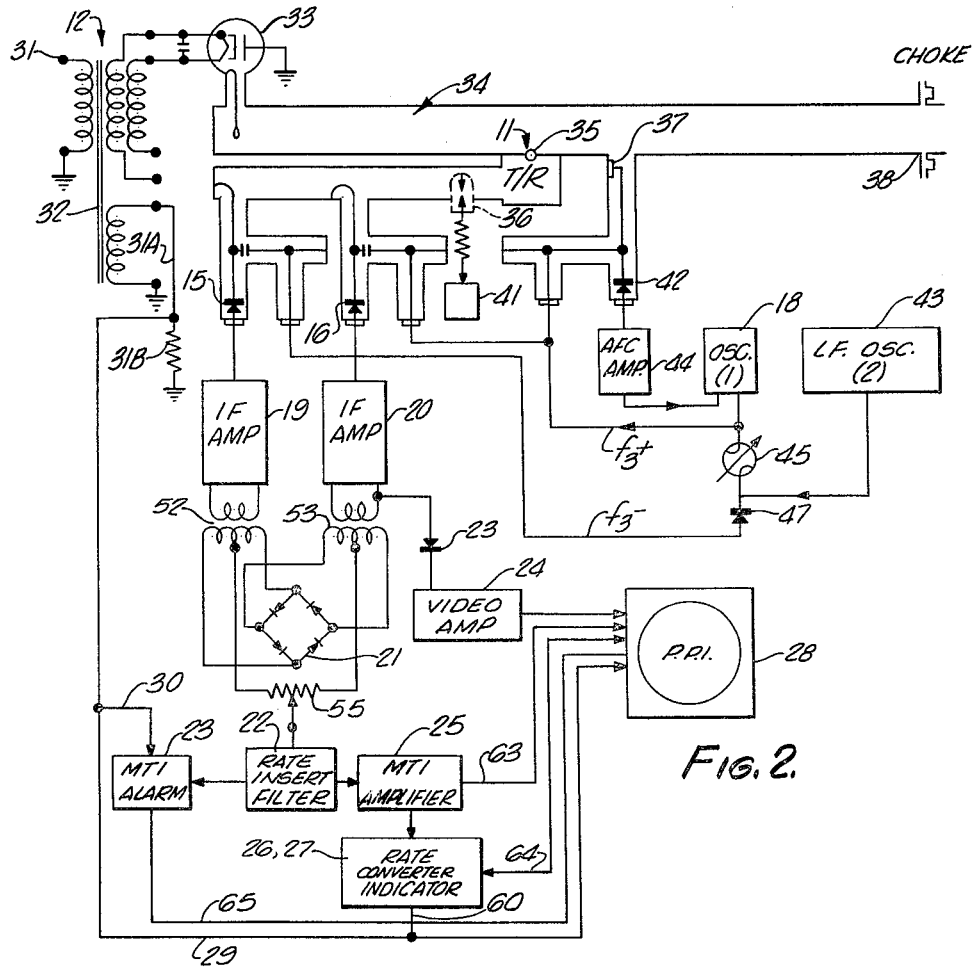
FIGURE 2 illustrates in more detail certain components and their physical inter-relationship, also indicated in FIGURE 1, and serves to illustrate also other features of the present invention that involve maintenance of a fixed frequency difference between local oscillations used in the dual channel superheterodyne system in FIGURE 1.

FIGURE 2 directed to a microwave radar system serves to illustrate a beat detector, a means to produce stable local oscillations, and the receiver mixing system and for convenience in comparison, corresponding elements in the drawings have identical reference numerals.

In FIGURE 2 the radar transmitter modulator input connects to terminal 31 of pulse transformer 32 as is conventional to radar systems. The pulse transformer 32 contains two output circuits which are activated by a modulator signal. One circuit 31A connects to a resistance component 31B and provides a trigger signal to PPI monitor 28 via circuit 29 and via circuit 30, a signal, to disable MTI alarm 23 during pulse transmit time. A second output circuit of pulse transformer 32 is connected to magnetron oscillator 33 to provide oscillator 33 with driving voltage during pulse transmit time. The output of magnetron oscillator 33 is probe coupled to wave-guide 34. During the presence of the transmit pulse pre T/R (transmit/receiver) tube 35 fires to short the iris of the T/R cavity 35 to prevent transmit power being fed to the radar receiver mixers. The transmit pulse frequency is sampled at attenuator coupling 37 and energy of such frequency is applied to AFC (automatic frequency control) mixer 42. The AFC mixer 42 has applied thereto a locally produced microwave oscillation from oscillator (1) unit which is designated as having a frequency $f_3+$. The AFC amplification and frequency phase discrimination unit 44, by heterodyne action in mixer 42, produces a control frequency, which maintains the output frequency $f_3+$ of oscillator 18 to a frequency value higher in frequency than the transmitter frequency by an amount corresponding to the IF frequency $f_1$ of IF amplifier 20.

Further, the controlled output frequency $f_3+$ of oscillator 18 is coupled via resonant cavity 45 to mixer 47. A local oscillation is produced by oscillator (2), LF oscillator unit 43. LF oscilllator 43 is a stable crystal controlled source of oscillation having a frequency which is twice the frequency of the fixed intermediate frequency of IF amplifiers 19 and 20. The locally produced oscillation of LF oscillator 43 are coupled to mixer 47 in a heterodyne, or beat frequency circuit, to produce an output frequency $f_2-$ which is lower in frequency than the transmitted frequency in an amount equal to the fixed intermediate frequency.

The incoming and therefore received target echo signals are admitted by the pre-T/R tube 35 to the T/R cavity. These signals are passed by T/R tube 36, detonized by keep-alive voltage source 41, and passed to mixers 15 and 16.

When the received target echo contains a radial component of velocity apparent as a Doppler frequency increase, mixer 15 produces a heterodyne frequency higher in frequency than the fixed intermediate frequency of IF amplifier sum channel 19. Conversely, mixer 16 produced a heterodyne frequency lower than the fixed intermediate frequency of IF amplifier difference channel 20. The amplified outputs of IF amplifiers 19 and 20 are coupled by transformers 52 and 53 to the beat detector modulator circuit 21. The beat frequency difference is applied from the adjustable tap on resistor 55 to the rate insert filter 22 input circuit. The signal outputs of rate filter 22 are coupled to the MTI alarm 23 and MTI amplifier 25. Signals to MTI alarm 23 actuate the alarm to indicate a moving target has been detected. A circuit 65 is connected between MTI alarm 23 and the PPI monitor 28 to indicate the sector in which the target is moving. Signals from MTI amplifier 25 are coupled by circuit 63 to PPI monitor 28 for display indication of the moving target. In addition, the MTI amplifier 25 couples signals to the MTI target rate converter, indicator 26, 27, to compute and numerically display the target radial rate. A circuit 64 is connected between PPI monitor 28 and rate converter 26 to show an input connection of target relative position. This input is desirable for computational modification of radial rate due to target relative position.

The video detector 23 and video amplifier 24 detects, amplifies and couples all target echo signals to PPI monitor 28 as a means to display all detected targets by conventional means. Choke joint 38 illustrates a conventional means of coupling the transmitter line section 34 to an antenna waveguide transmission line.

Figure 3:
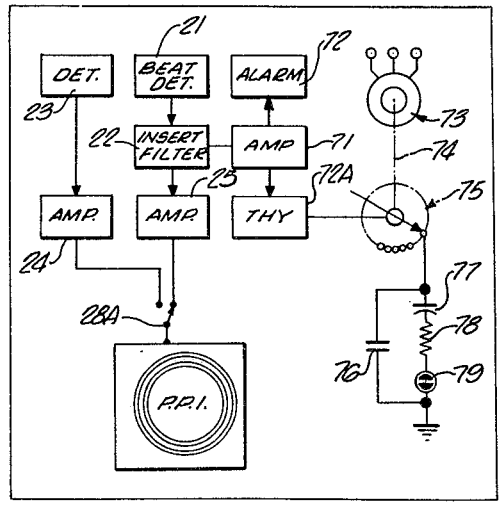
FIGURE 3 illustrates still other features of the present invention involving the production of a visual display of a particular PPI sector.

FIGURE 3 illustrates a means to visually indicate a sector in which a moving target is detected. The units 23, 24, 21, 22 and 25 have been previously described in function and are shown in FIGURE 3 for purposes to clarify by illustration.

When echo signals are received by the radar system which contain a radial component of velocity in excess of the rate setting of rate insert filter 22 these signals are coupled to MTI alarm amplifier 71. One output circuit of MTI alarm amplifier 71 connects to alarm circuit 72. The alarm circuit 72 serves notice by audible and/or visual means that a moving target has been detected. Simultaneously, a further output circuit of MTI alarm amplifier 71 is connected to thyratron circuit 72A to fire a thyratron and provide a voltage to commutator switch 75. The movable element of commutator switch 75 is positioned to correspond to the relative target position by synchro 73 which coupled by drive shaft 74 to such movable element, the synchro responds to the position of the transmitting-receiving PPI antenna. The thyratron firing voltage coupled by commutator switch 75 is impressed upon the corresponding storage capacitor 76. Capacitor 77, resistor 78 and neon lamp 79 are shown connected as a part of a visual blinker circuit. The stored charge of capacitor 76 supplies the blinker circuit to blink the neon lamp 79 in the section in which a moving target is detected. To illustrate by way of example, if seventy-four equally spaced lamp and blinker circuits are installed to bracket each five degrees of the PPI monitor azimuth scan, a blinking lamp then serves as a visual moving target alarm in the five-degree sector in which the target was detected.

The value of capacitor 76 is such as to maintain the visual alarm through a 360 degree scan. When the radar system is in operation displaying all target echoes, the alarm circuit 72 serves as a moving target indicator generally and the PPI blinker light 79 identifies the target sector specified.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a moving target indicating system, signal receiving means including a pair of signal conditioning channels each having an input circuit receptive to a common input signal, heterodyning means in each signal conditioning channel receptive to said common input signal and incorporating oscillation generating means producing oscillations of different frequency which are related to the nominal frequency of said common input signal such that the frequency of said oscillations in different ones of said channels is correspondingly greater and less than the nominal frequency of said input signal by substantially the same amount; heterodyning means coupled to the output circuit of each of said conditioning channels and producing a beat signal representative of the difference in frequency of the output signal in the pair of conditioning channels, and means coupled to the last mentioned heterodyning means and producing an indication in accordance with said beat sigal.

2. In a moving target indicating system wherein a superheterodyne receiver is used to receive an echo signal, to apply said echo signal to a mixer stage to heterodyne the echo signal with a locally generated oscillation having a frequency different from the frequency by an intermediate frequency to develop an intermediate frequency signal, the improvement which resides in adding an additional channel to said receiver, said additional channel including: a mixer stage receptive to said echo signal; a source of locally generated oscillations coupled to the last mentioned mixer stage and having a frequency different from the frequency of the first mentioned oscillations and related to the frequency of said echo signal such that the different oscillations are correspondingly greater and less than the frequency of said echo signal to develop a second intermediate frequency signal in said additional channel; and providing means for heterodyning said first and second intermediate frequency signals to produce a beat signal having a frequency representative of the movement of the object from which said echo signal is derived.

3. A system as set forth in claim 1, including highpass filter means coupled between the last mentioned heterodyning means and said indicating means.

4. A system as set forth in claim 1, including switching means for alternately coupling said indicating means either to said last mentioned heterodyning means or to the output circuit of only one of said channels.

5. A system as set forth in claim 1 in which said indicating means produces an audible indication.

6. A system as set forth in claim 1 in which said indicating means produces a visual indication.

7. A system as set forth in claim 1 in which said indicating means produces a numerical indication.

8. A system as set forth in claim 1, including pulse generating means for producing pulses, said pulse generating means developing keying signals which are applied to said indicating means to periodically disable the same.

9. A system as set forth in claim 1 in which said indicating means includes plan position indicating means wherein radial cathode ray beam sweeps are correlated with the oriented position of an antenna which receives said echo signals and applies the same to said signal receiving means, said beat signal being applied to said indicating means to change the intensity of said cathode ray beam sweeps.

10. A system as set forth in claim 9, including a plurality of signal storage means, switching means selectively operated in accordance with the position of said antenna for selectively applying a signal representative of said beat signal to said storage means.

11. A system as set forth in claim 10 in which said signal storage means includes a capacitor, a second capacitor, a resistance and a gas discharge tube, said second capacitor, resistance, and tube being connected in a series circuit which is shunted by the first mentioned capacitor.

12. In a system of the character described, a first source of oscillations of a first frequency, a second source of oscillations, means controlling said second source in accordance with said first frequency to produce second oscillations of a second frequency related to said first frequency, a third source of oscillations producing oscillations of a stable third frequency, means heterodyning said second oscillations of said second frequency with said third oscillations of said third frequency to produce fourth oscillations of a fourth frequency, a dual channel superheterodyne receiver receptive to signals of said first frequency and having different mixer stages in different channels thereof supplied respectively with said second and fourth oscillations.

13. A system as set forth in claim 12 in which said dual channel receiver has two different intermediate frequency amplifiers each tuned to the same intermediate frequency, and said third oscillations having a frequency which is a multiple of said intermediate frequency.

No references cited.